Nov. 3, 1964    G. M. MAST ETAL    3,155,979
ROTATING PRISM OPTICAL SYSTEM
Filed March 25, 1963    6 Sheets-Sheet 1

INVENTOR.
GIFFORD M. MAST
BY WRIGHT K. GANNETT
ATTORNEY

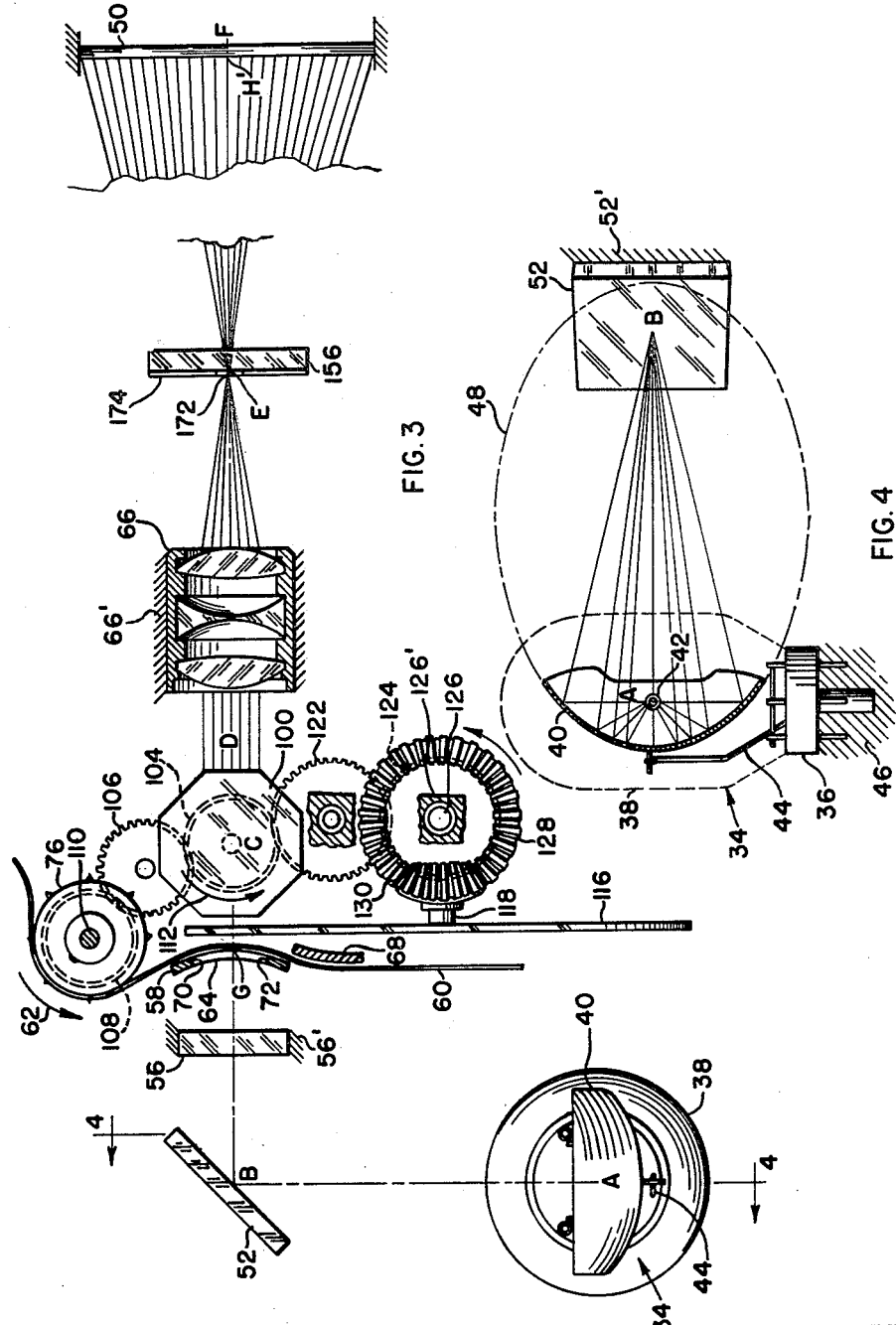

Nov. 3, 1964
G. M. MAST ETAL
3,155,979
ROTATING PRISM OPTICAL SYSTEM
Filed March 25, 1963
6 Sheets-Sheet 3
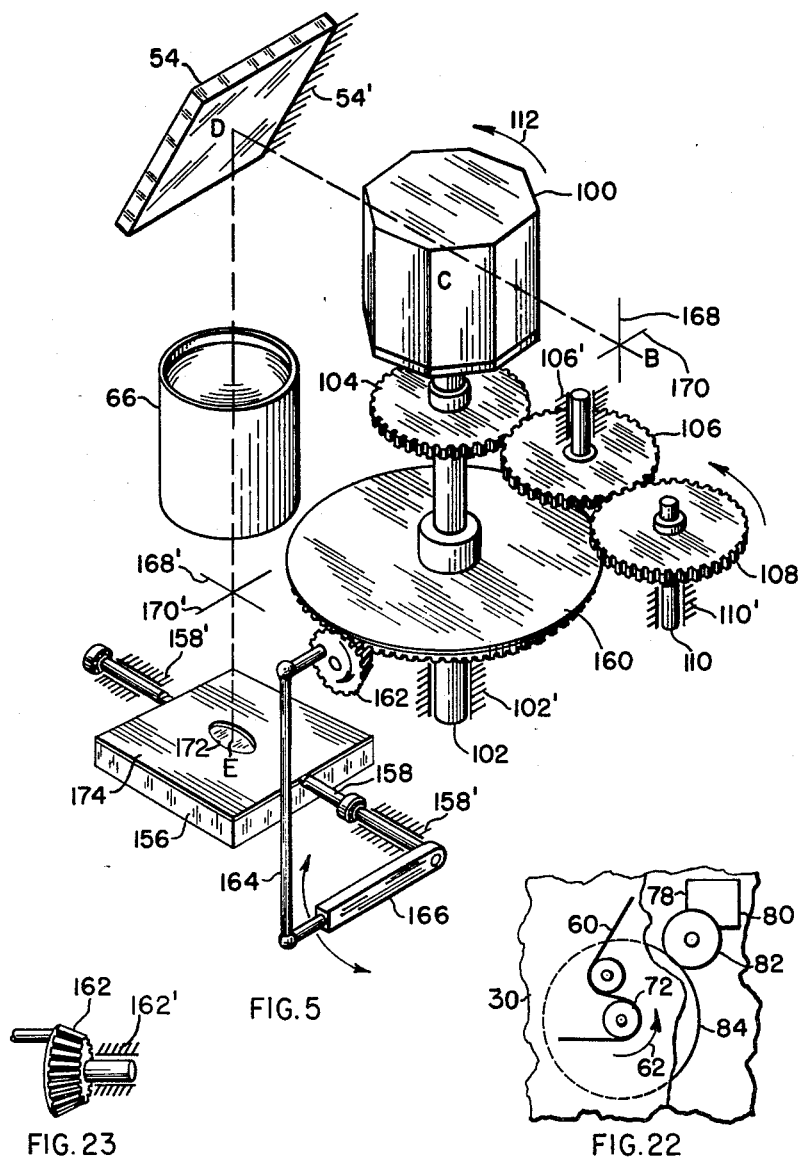
INVENTOR.
GIFFORD M. MAST
BY WRIGHT K. GANNETT
ATTORNEY Nov. 3, 1964  G. M. MAST ETAL  3,155,979
ROTATING PRISM OPTICAL SYSTEM
Filed March 25, 1963  6 Sheets-Sheet 4
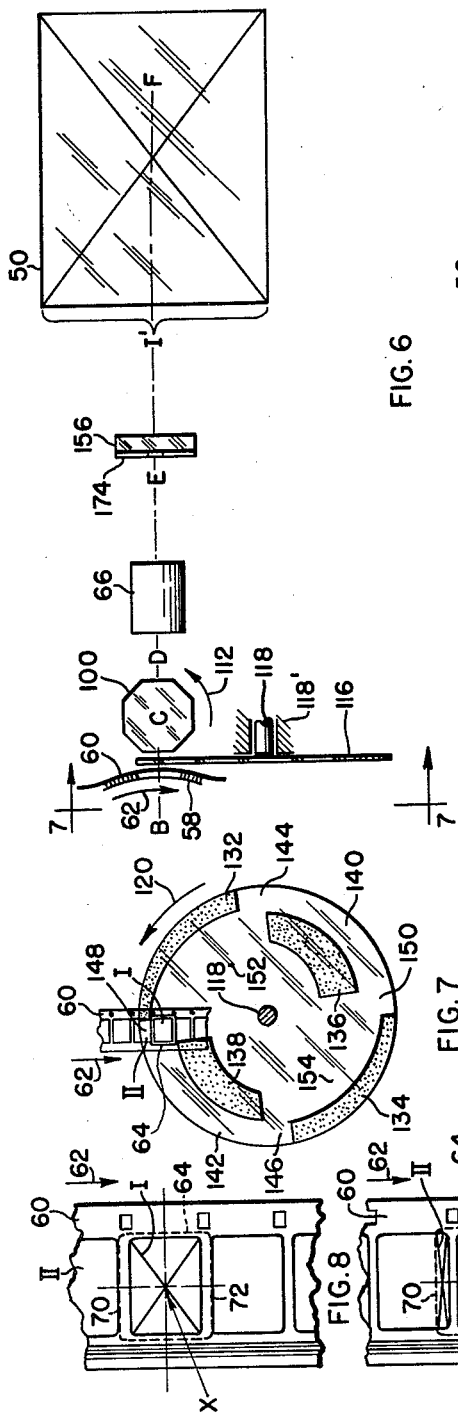
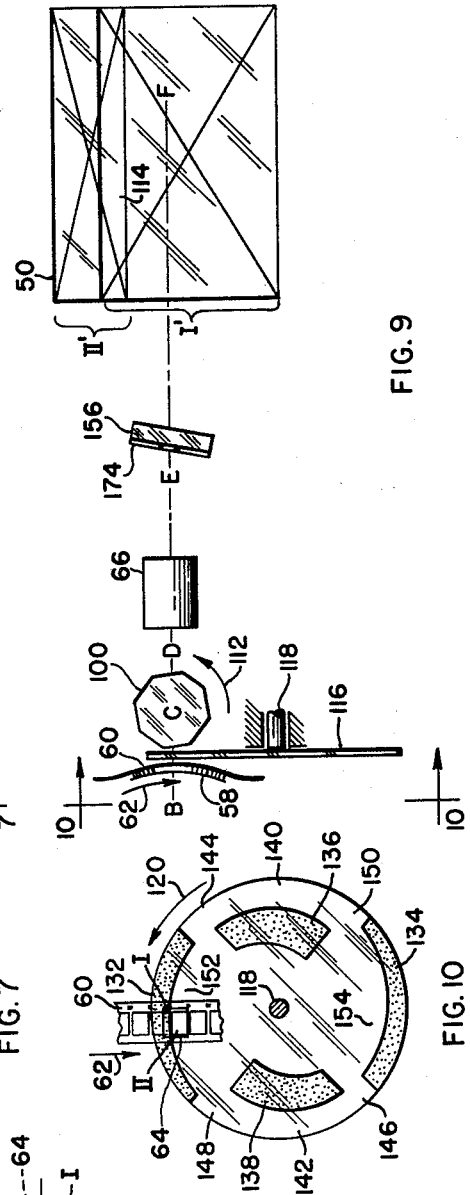
INVENTOR.
GIFFORD M. MAST
BY WRIGHT K. GANNETT
*ATTORNEY*

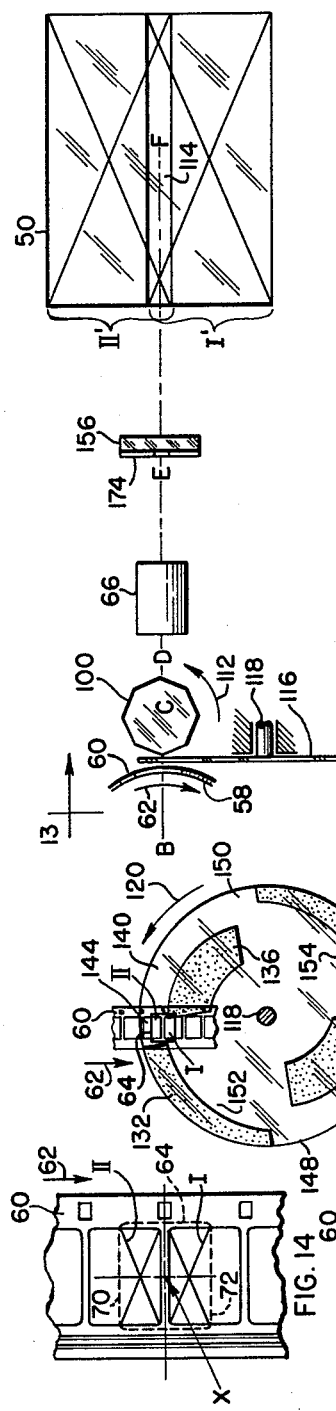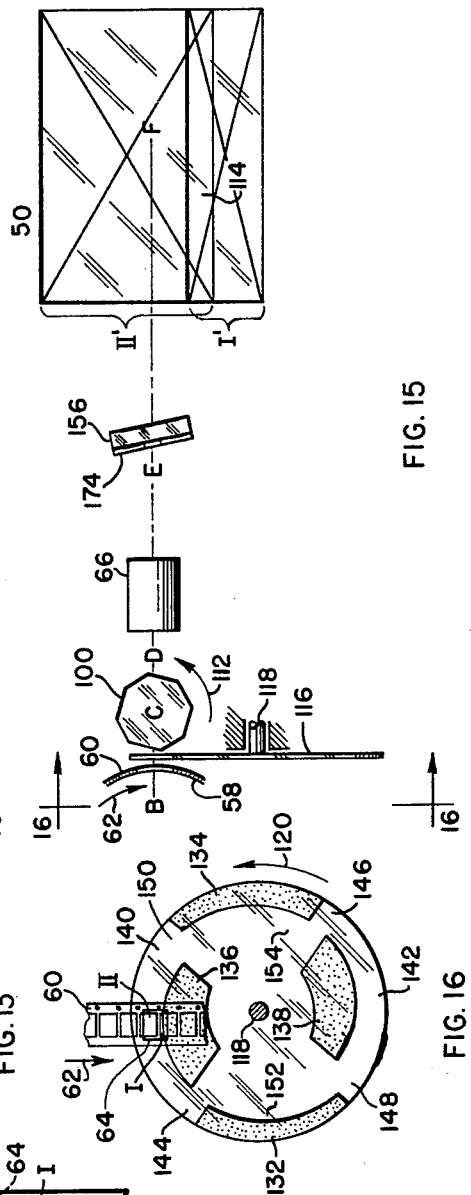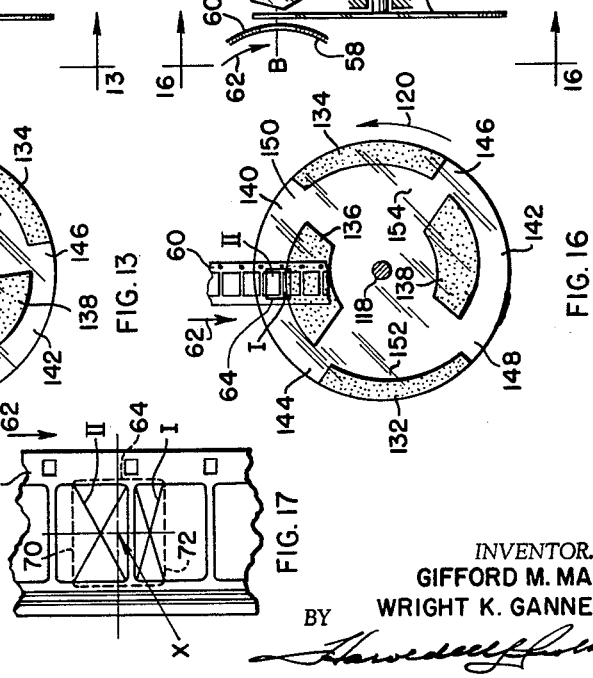

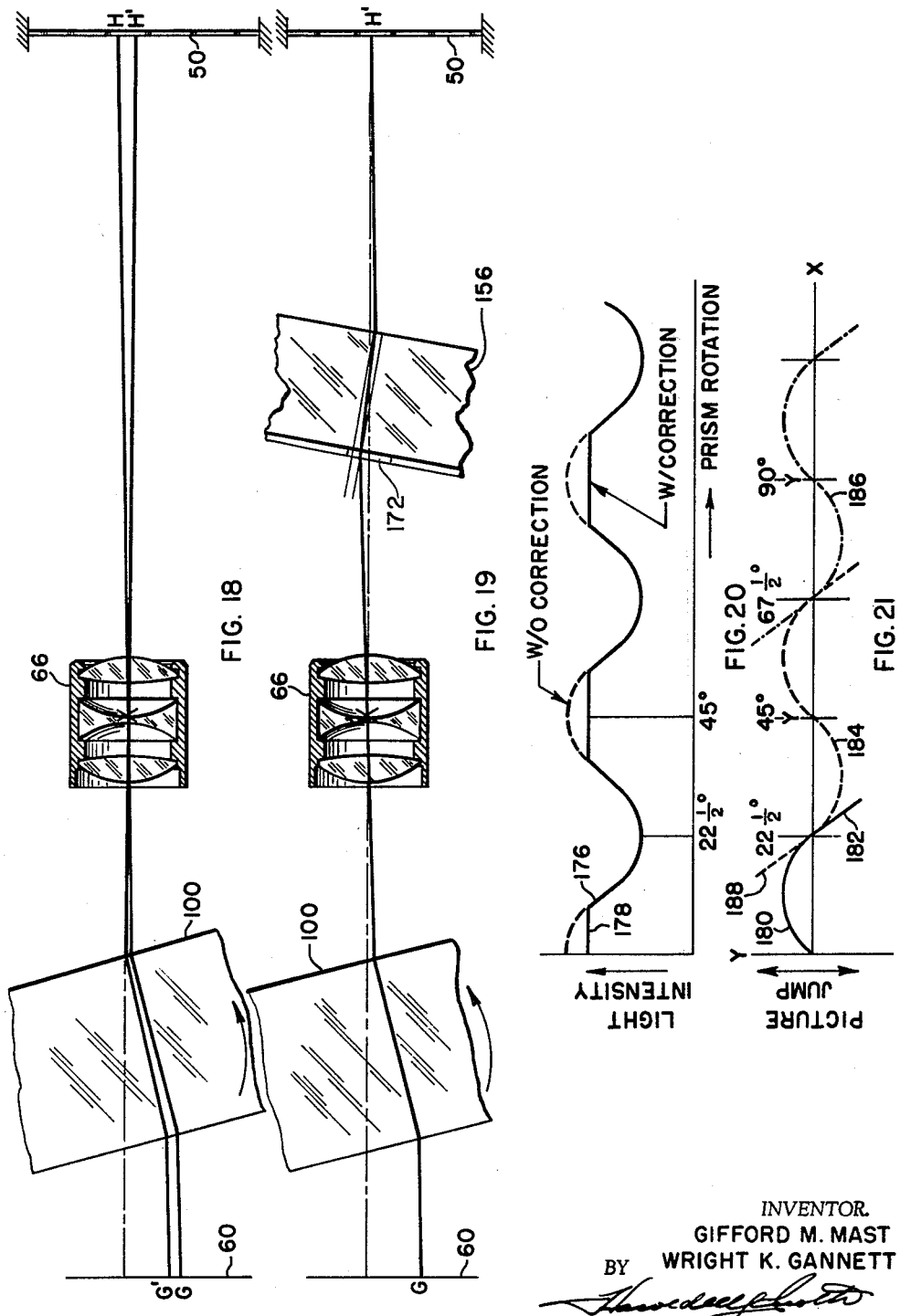

United States Patent Office 3,155,979
Patented Nov. 3, 1964

3,155,979
ROTATING PRISM OPTICAL SYSTEM
Gifford M. Mast and Wright K. Gannett, Davenport, Iowa, assignors to Mast Development Co., Davenport, Iowa, a corporation of Iowa
Filed Mar. 25, 1963, Ser. No. 267,582
9 Claims. (Cl. 352—119)

This invention relates to motion picture apparatus and more particularly to that type in which a rotating prism is exploited to immobilize the picture projected from film that moves through the film aperture continuously and at a uniform rate rather than intermittently via mechanical devices such as used in the better known systems.

As will be clear to those versed in the art, a rotating prism system possesses certain inherent defects that tend to render it unacceptable in a quality system unless the prism used has a relatively great number of facets, twenty-four being the number most frequently used. But such prisms are bulky and expensive and, therefore, considering also such defects as light restriction, "flicker" (intermittent variations in light intensity), poor image quality and "jump" (vertical movement of picture because of prism imperfections), such systems can be economically justified in only expensive applications as in shutterless conversion of twenty-four-frame-per-second motion pictures to thirty-frames-per-second for television broadcasting or low-cost low-facet applications as in toys, editing viewers, etc. where the above noted defects can be tolerated.

One of the primary objects of the present invention is to provide simple, novel and low-cost improvements in a rotating-prism system employing a prism having relatively few facets to utilize therewith novel instrumentalities, means and carefully selected optical components so as to render the system feasible and commercially acceptable for areas beyond the low-cost areas noted above. Specifically, it is a significant object to utilize a prism having on the order of eight sides or facets in combination with corrective means for reducing to an acceptable extent the above-noted deficiencies and thereby to obtain a brighter, steadier, more flicker-free, higher quality picture more nearly comparable with pictures projected by systems using large prisms. Other objects relate to an improved light source, reduction of heat, easier film handling and improved film drive. Although the invention is thus directed toward what may be regarded as an "economy" system in which the prism has few facets, many of the principles, to be subsequently elaborated, will be found to be applicable to systems featuring prisms having greater numbers of sides or facets.

The foregoing and other important objects and desirable features, inherent in and encompassed by the invention, will become apparent as a preferred embodiment thereof is, by way of example, disclosed in the ensuing specification and accompanying sheets of drawings, the figures of which are described below.

FIGURE 3 is a schematic, with parts in section, of the over-all optical system, with some portions of the drive means shown and some portions of the support means in section.

FIGURE 4 is a section generally on the line 4—4 of FIGURE 3.

FIGURE 5 is an enlarged perspective of part of the optical components and the drive therefor, with supporting parts shown in section.

FIGURE 6 is a schematic view, reduced in scale as respects FIGURE 3 and omitting the light source and related parts and showing the screen at 90° to its position in FIG. 3.

FIGURE 7 is a view as seen generally on the line 7—7 of FIGURE 6.

FIGURE 8 is an enlarged fragmentary view of that portion of the film that is seen in the film aperture of FIGURES 6 and 7.

FIGURE 9 is a view similar to FIG. 6 but showing an advanced condition of the film and the relationships of the other parts thereto.

FIGURE 10 is a view on the line 10—10 of FIGURE 9.

FIGURE 11 is an enlarged fragmentary view of that portion of the film that is seen in the film aperture of FIGURES 9 and 10.

FIGURE 12 is a view similar to FIGURES 6 and 9, but showing a further advanced condition of the film and the relationships of the other parts thereto.

FIGURE 13 is a view on the line 13—13 of FIGURE 12.

FIGURE 14 is an enlarged fragmentary view of that portion of the film that is seen in the film aperture of FIGURES 12 and 13.

FIGURE 15 is a view similar to FIGURES 6, 9 and 12 but showing a further advanced condition of the film and the relationships of the other parts thereto.

FIGURE 16 is a view on the line 16—16 of FIGURE 15.

FIGURE 17 is an enlarged fragmentary view of that portion of the film that is seen in the film aperture of FIGURES 15 and 16.

FIGURE 18 is an enlarged, somewhat exaggerated schematic view showing the passage of a light ray through the prism without correction.

FIGURE 19 is a similar view and illustrates the correction.

FIGURE 20 is a charted view showing light intensity as related to prism rotation, with and without (partial) correction.

FIGURE 21 is a charted view showing picture "jump" as related to prism rotation, without correction.

FIGURE 22 is a fragmentary schematic view showing part of the film drive means.

FIGURE 23 is an enlarged fragmentary view, partly in section, showing the support for the small bevel pinion of FIGURE 5.

Figure 1:
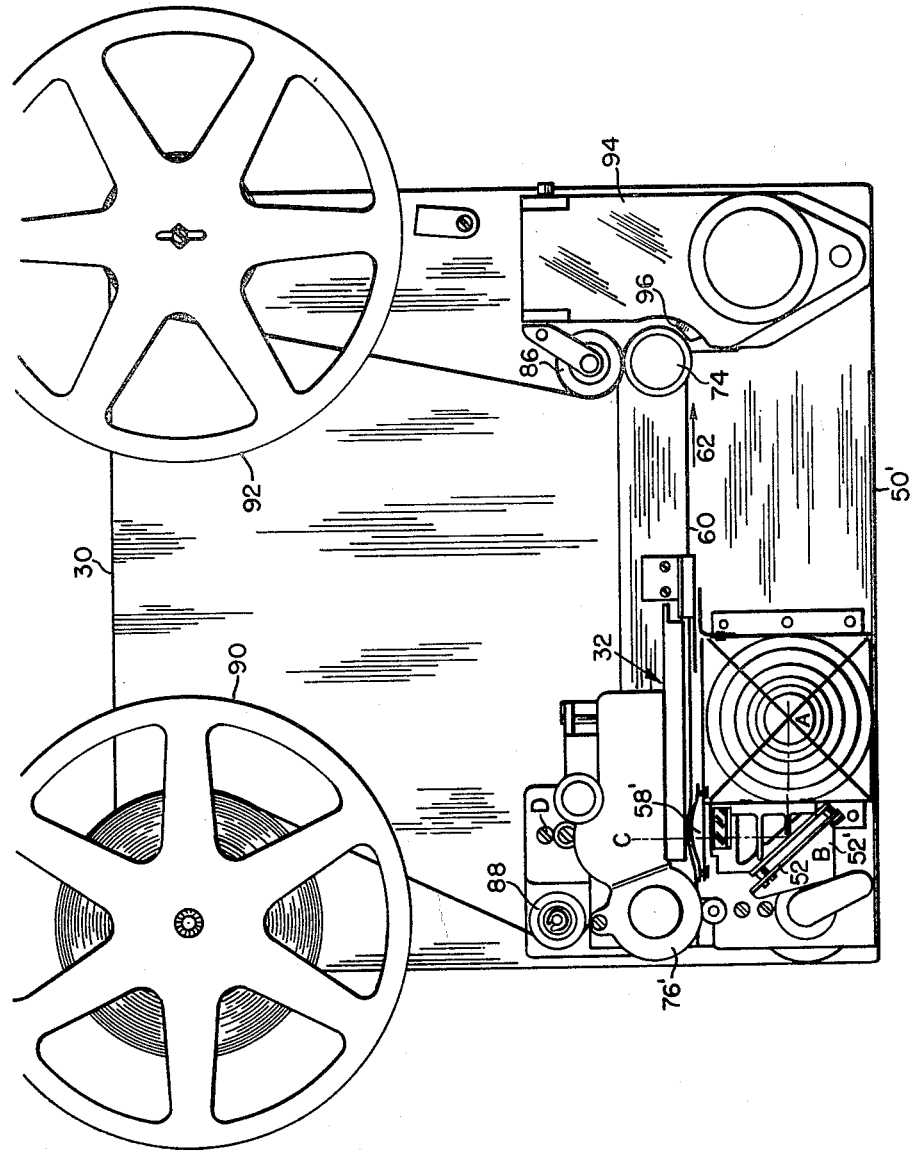
FIGURE 1 is a plan view of a representative cabinet or case projector in which the invention is embodied, portions of the film reels being omitted.

The numeral 30 in FIGURE 1 designates a typical cabinet or case in which the entire projector is carried or on which external components are supported and which furnishes support means for the internal components, as will be described later.

At the lower left-hand corner of the case, as seen by the reader, is a unit 32 which houses the light source and related parts. In this case the light source is an electric lamp 34 (FIGURES 2 and 4) having a base 36, a glass envelope 38, a reflector 40, a filament 42 and suitable supports for the reflector. The lamp is socketed in a support part as at 46. The reflector 40 is a section of a prolate spheroid (dotted lines 48 in FIGURE 4). This spheroid is formed about two foci, one of which is or is included in the filament 42 and is designated A and the other which is designated B. The focus A is the near focus and the focus B is the remote focus as respects the light source or filament 42, regarding the filament, theoretically, as a point. The substantial size of the filament used, however, causes the light to be badly focused. The net result is that a conglomeration of light flux is pretty well directed down the projection axis, but is not brought to a true focus. The foci A and B are spaced along and include the portion AB of the optical axis which, extended to a screen 50, is designated as ABCDEF. Different portions of this axis appear in different figures or are related to portions of such figures for convenience. Thus AB appears in FIGURE 4; ABCDEF in FIGURE 3; ABCD in FIGURE 1; BCDEF in FIGURE 5 etc. In the interests of achieving a compact structure, the optical axis may be "folded" in portions other than as shown in FIGURES 3 and 5, so that the screen can be mounted on what may be regarded as the front wall of the projector, as at 50' (FIGURE 1).

The fold in the optical axis at B in FIGURES 3 and 4 is achieved by the use of a mirror 52, suitably supported as at 52' in a portion of the unit 30, inclined to and intersecting the optical axis. Another fold occurs at D (FIGURES 1 and 5) by the use of another angled mirror 54, supported at 54'. In order to achieve the position of the screen 50 at 50', as noted above, it will be necessary to employ one or more mirrors between E and F, but, since this is largely immaterial to the present invention, it has been omitted. It will be further understood that the optical axis could be continuously straight or otherwise optically arranged. This will have some bearing on the use herein of terms such as parallel, transverse, etc. since something parallel to one portion of a folded axis may not be parallel to another portion, for example. Such terms, therefore, as the above must be read relative to a straight axis or as modified by the adjective "optically"; e.g., optically parallel.

There is some significance, however, to the fold at B, because the mirror 52 is used to reduce the reflection of heat, without substantially reducing the reflection of visible light into the optical system. Added importance occurs in its combination with the particular lamp 34, which gives off a great deal of light and heat. Both the mirror 52 and the lamp-internal-reflector 40 are dichroic, being so made as to reflect most of the visible light while transmitting most of the infrared. Approximately 70%, therefore, of the infrared radiation will be transmitted through reflector 40 and out of the optical system, while about 70% of the remainder will be transmitted through the mirror 52 and out of the optical system. The unit 32, which houses the lamp 34 and mirrors 52 and 54, is appropriately ventilated. A heat filter 56, supported at 56', may be used downstream of the mirror 52 and just ahead of film carrier means 58, here shown as of arcuate or curved section transverse to the optical axis with the curve lengthwise of the film 60. The path and direction of travel of film 60 is shown by the arrow 62. The carrier 58 has a film aperture 64 of rectangular shape and somewhat larger in area than a frame of the serially-framed film. The aperture is larger especially in the dimension parallel to film travel. The curved carrier 58 causes the film to bend (convex in plan view) in the direction of a projection lens 66, supported at 66'. Nevertheless, the area at the carrier will be spoken of as a "plane" for convenience. An additional portion of film guide means is shown at 68. It can be shown empirically that the average focus across the picture for the totality of prism positions can be improved by bending the film track or carrier, and thus the film, in this manner.

Having regard to the relationship among the film, the film aperture 64, the film frames and direction of travel of the film, it will be seen that each film departing from the aperture—or moving in the direction of departure—is followed by the next consecutive frame entering the aperture. Hence, the aperture may be said to have frame-entry and frame-departure edges 70 and 72. These are shown here as upper and lower edges, respectively, in FIGS. 3 and 6–17, with the film traveling downwardly (arrow 62); but in the actual machine, the film moves horizontally, left to right as seen in FIG. 1. In either event, however, this is immaterial and the particular geography establishes no limitations on the broader phases of the invention.

Figure 2:
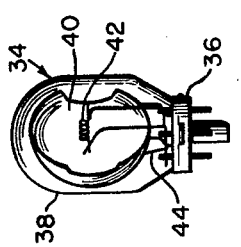
FIGURE 2 is a perspective of the lamp used in the system.

The film may be driven in any manner, but according to the present invention it is preferred to drive it from a sprocketed capstan 74 (FIGS. 1 and 22) so as to tension the film between that point and an idler sprocket 76 (FIG. 3; concealed by a cover 76' in FIG. 1). The area in FIG. 1 in which the film carrier 58 is located and mounted in the unit 32 can be readily seen at 58' by noting the intersection of the optical axis portion BC with the straight run of film between 72–76'. Since the film is tensioned in this area it will be readily pulled past the carrier 58 and across the film aperture 64 continuously and at a uniform rate as the driving capstan is rotated, as by a small electric motor 78 having a drive wheel 80 frictionally engaging an idler 82 which in turn frictionally engages a flywheel 84 coaxially keyed to the shaft to which the capstan 74 is coaxially keyed (FIG. 22). Control or guide wheels of conventional types, as at 86 and 88 (FIG. 1), may be used respectively with the capstan 74 and idler 76. The film is unwound from a reel 90 on to a second reel 92, both rotatably carried on the case 30 in any manner, not material here. Rewind means (not shown) may be employed for rewinding the film on the reel 90.

Provision is made for accommodating film with a sound track and for this purpose the case 30 carries at its right-hand corner an audio unit 94, including a sound pick-up 96, which may be of any known type. Other typical refinements, not material, are included in the production or commercial projector.

A rotating prism 100, of glass or its optical equivalent, is located intermediate the film (at the carrier 58) and the projection lens 66 and has its long axis, which is also its axis of rotation, intersecting the optical axis at C and at right angles thereto. The prism axis is also transverse to the length of the film. The prism is carried by a shaft 102 (FIG. 5) which is journaled at 102' in any suitable manner as set forth generally above and this shaft has fixed thereto a gear 104 which is in constant mesh with an idler gear 106, adequately journaled as at 106', which in turn constantly meshes with another gear 108. The gear 108 is keyed to a shaft 110, suitably journaled at 110', which has fixed thereto the rotatable and sprocketed film carrier 76. This gear train 108–106–104 is thus driven by the film. The gear ratio is so chosen that the prism turns uniformly at a rate of one facet or side per frame of film. As will be developed in detail later, the prism shown here is, of course, a regular prism and has eight identical facets or sides. If a larger number of facets were used, the rate of rotation would still be the same; viz., a rotation of one facet per frame. The length of the prism is greater than the width of the film so as to accommodate all transmitted light. The direction of prism rotation, shown by the arrow 112, is such that the facets nearer to the film turn in the same direction that the film travels.

At this point, it may be well to note the basic characteristics of rotating prisms. In any case, the prism must of course be geometrically regular. It must have an even number of facets in excess of two. Opposite sides of such prisms, being parallel, are equivalent to a flat glass place in refracting light from the corresponding or registering film frame or frames. With the correct combination of prism thickness and index of refraction for a given prism, the varying refraction as the prism rotates substantially compensates for film travel. The prism size further depends on frame size, and it will be found, for example, that the required frame-to-frame compensation is greater for single-frame-format 35 mm. film than for angle-frame-format 16 mm. film. The latter is shown here by way of example. The compensation in any case is not precisely linear but follows a sine function. The departure from linearity is small for prisms having a large number of sides or facets, because the facet-to-facet angle, measured about the prism axis (360° divided by the number of facets), is so small that the sine of the angle is substantially identical to the arc during a single facet-to-facet (equals frame-to-frame) motion. On the other hand, for prisms having relatively few facets the facet-to-facet angular motion is greater, so that this departure becomes great enough to cause objectionable picture "jump" on the screen frame-to-frame vertical movement of the image caused by non-linearity of the refraction correction). It is possible to compensate for picture jump by non-linear gearing between the film drive and the prism or by oscillating mirrors in the projection path. The present invention, however, compensates for jump in a different and better-controlled manner, the description of which is postponed here until the treatment of prism characteristics is completed.

The greater facet-to-facet angle of turn of a prism having relatively few facets (four, eight, twelve) can be made to yield substantially as accurate a refractive compensation as the smaller angle of turn of a prism having more facets, the thickness of the prism being roughly proportional to the number of facets. The greater angle of turn, however, for a prism having a small number of facets aggravates the well-known defects such as focus, distortion, spherical and chromatic aberration, astigmatism and throttling or restriction of the light. These defects are minimum in a given system when a film frame and a corresponding prism facet are centered on and square to the projection axis but they become progressively worse as the frame and facet move off center, and they occur asymmetrically about the center of the picture area at the screen.

All these aberrations are aggravated by increasing the angles of incidence of light rays entering the prism. These rays may be classified (*a*) as those that enter in and around planes parallel to the prism axis, and (*b*) those that enter in and around planes transverse to that axis. Since the prism turns, its facets constantly change angle to the incident rays of both classifications, i.e., (*a*) and (*b*). Some of the class (*b*) rays are already at substantial angles of incidence even when the prism facet is square with the projection axis. As the prism turns, the total angle of incidence of a given class (*b*) ray becomes very large at some point, thereby inducing severe aberrations among a pencil of rays. The rotation of the prism does not increase the total angles of incidence of class (*a*) rays so grossly. The net result of the totality of positions of the prism is that the prism exhibits astigmatism, because it passes a greater proportion of class (*a*) rays, for equal aberration, than it passes of class (*b*). This astigmatism lends to the use here of a novel astigmatic (elliptical) stop in the optical system that obtains the brightest possible picture with the least degradation thereof. According to the present invention, this elliptical stop can be physically combined with the means for compensation of image jump. It is not necessary to combine these features, however, and it is also felt that these features are novel regardless of whether they are applied separately or together.

It should be observed at this point that the present invention, although certain of its principles are broadly applicable, is concerned primarily with the use of a prism having relatively few facets because of the substantial economies that can be achieved. A prism having eight sides or facets is chosen because, despite the added costs of the compensating instrumentalities, a low-cost but acceptable system results, even though it is not as optically ideal a system as one having, say, twenty-four facets. As already pointed out, nevertheless, the cost of the inventive system is far below that of a twenty-four-facet prism system and still produces brighter, higher-quality projected pictures than has hitherto been possible on systems using prisms having few facets.

One advantage that a twenty-four-facet prism has over a prism having fewer facets is that, with the former, two *full* frames can be projected simultaneously when the prism has diametrically opposed corners centered on the projection axis. At that time these two frames are centered respectively on opposite sides of the projection axis. This position is called mid-transfer. It is well established that such simultaneous projection is required to avoid flicker (intermittent variations in light). Where the prism has relatively few facets, however, the tendency is to cut off a portion of the projected picture at the screen (referring to a single picture projected through a single pair of facets), leaving a portion of the screen dark, thereby increasing the appearance of "busy-ness" and flicker. Prisms having few facets also tend strongly to throttle the light as they rotate, causing greater cyclical variations in light intensity at the screen than in the ideal system. Hence, in any system, the film aperture must have such dimension lengthwise of film travel greater than the height of one frame and in some cases equal to twice the height of two consecutive frames so as not to cut off light that the system is otherwise capable of projecting. As this area becomes larger, a proper condenser must be used so as to "cover" this area with properly directed light (light that will enter the projection lens). In the present case, the condenser is embodied in the lamp 34. If a conventional lamp were used, a conventional glass condenser would be placed between the lamp and the film aperture.

Having reference again to the timing of film travel and prism rotation, it is seen that the prism turns at the rate of one facet per film frame, noting also that, as each facet enters a phase of becoming square with the optical or projection axis, its diametrically opposite fellow does likewise but from the opposite side of the projection axis. Each time a pair of diametrically opposed facets is centered on the projection axis, a frame of film is fully centered in the film aperture, giving optimum picture results at the screen. As the film continues to travel and the prism continues to turn, however, the frame centered in the film aperture begins to depart from the aperture, followed by entry of the next consecutive frame, and the pair of facets correspondingly turn away from the projection axis to be followed by the respective consecutive facets. When the prism condition is such that a diametrically opposed pair of corners centers on the projection axis, the departing frame (old frame) will be at the departing side of the projection axis and the entering frame (new frame) will be at the opposite side of said axis. In other words, the two consecutive old and new frames straddle the projection axis. In a twenty-four-facet prism, for example, where the angle of turn is small, the two projected frames accurately overlie each other on the screen and are not seriously affected by jump, distortion or aberrations.

But a prism of fewer facets, for example eight as shown in the present embodiment, cannot produce these results, because, for one thing, such a prism at mid-transfer projects only about one-half of the field of each of the two frames straddling the projection axis. Even were it capable of projecting both frames in full, distortion and aberration would be so bad that the two projected pictures would not accurately overlie each other. On the other hand, each picture by itself would be acceptable.

An eight-facet prism, having a facet-to-facet angle of 45°, will at mid-transfer have turned half of this angle, or 22½°, enough to compensate for film travel of one-half of a frame. As the prism turns beyond mid-transfer, this angle increases for the old or departing frame and the projected picture from the old frame rapidly deteriorates to the point where it is unusable. The new frame, at the entering half of the film aperture, however, continues to improve as its prism facet approaches perpendicularity to the projection axis; and the new frame then becomes an old frame and so on. But each new frame, as it enters the film aperture, would, if projected, produce an inacceptably poor picture until its angle away from square with the projection axis decreases nearly down to 22½°. In other words, good pictures are projected from 22½° *before* square-with-axis to 22½° after square-withaxis. At mid-transfer, about half of the old and half of the new picture will be projected. Since these are opposite halves, the combination yields a complete picture on the screen. By correct design, optimum direction of condenser light, quality optical components, etc., these "halves" can be made to be slightly more than half so that they overlap on the screen in an area that might be regarded as a seam. Compare FIG. 6, wherein a single frame is centered on the projection axis and diametrically opposed facets of the prism 100 are perpendicular to the projection axis and which projects frame I (FIG. 8) to the screen as picture I', with FIG. 12, which shows the mid-transfer position wherein the prism has a pair of diametrically opposed corners centered on the projection axis while frames I and II straddle this axis (FIG. 14) to project pictures I' and II', each of which is somewhat more than a half picture so as to create the overlap or seam 114. There is of course no seam in FIG. 6.

As the projector runs, the prism of course "follows" the film and the seam 114 moves from the top to the bottom of the screen (in the orientation shown here). Compare FIGS. 9, 12 and 15, and the amount of each picture on the screen depends upon prism position; i.e., its relation to mid-transfer (FIG. 12), ahead of mid-transfer (FIG. 9) or after mid-transfer (FIG. 15). If this seam were negative (i.e., if the pictures did not overlap), a dark band would appear on the screen, which would contribute to "busy-ness" on the screen. Since the seam 114 is positive, however, the entire screen is covered with light at all prism positions.

At mid-transfer it is desirable to cover the *complete* screen with light from each of the two frames being projected. The reason for double projection is that the light flux from the two fields augments each other at the time when the light flux from each is minimum. The sinusoidal variation of light intensity due to throttling results in minimum light intensity around mid-transfer. Thus, having light from two frames at mid-transfer helps to fill in the "valleys" in the intensity curve. Additional compensation of light intensity can be achieved in a subtractive manner only; that is, by reducing the light intensity at the peaks of the intensity curve. This procedure, of course, reduces the average brightness in order to reduce the flicker. This reduction in brightness can be achieved by means of a moving, variable-density filter, as will be seen later.

It has already been pointed out here that picture quality deteriorates rapidly after 22½° prism rotation to the point where the picture is unsatisfactory for projection. This "rotation" can be thought of as proceeding either forward or backward in time to include new frames more than 22½° from said transfer (but moving toward mid-transfer), and old frames more than 22½° from mid-transfer (and moving away from mid-transfer). The condition is symmetrical. It is obvious that by use of a shutter or the like, the bad picture could be eliminated from the screen, but only at the expense of replacing the picture with a corresponding dark area on the screen. This dark area is undesirable because it increases the appearance of "busy-ness" and flicker. According to the present invention, flicker can be reduced by projecting diffused light in lieu of the bad picture. Broadly, this desired result can be achieved by light-diffusing means timed with film travel and prism rotation, one example of which is set forth below by way of illustration.

A disk 116, largely of transparent (subject to later qualification) glass or its equivalent, is mounted on a shaft 118, appropriately journaled as at 118' and geared to be driven by the film sprocket for timed rotation with the film and prism and in the direction of the arrow 120. The offset of the axis of the shaft 118 from the projection axis, and the plane of the disk, is such that peripheral portions of the disk intervene between the film and the prism (FIGS. 6, 9, 12, 15), and the angular rate of turn of the disk is such that it turns two revolutions for each revolution of the prism 100 (one revolution of the disk per two frames of film travel), established by a gear train as shown in FIG. 3, including a gear 122 in constant mesh with the prism gear 104 and driving a gear 124 keyed to a shaft 126 to which is keyed a bevel gear 128 in mesh with a bevel pinion 130 which is keyed to the disk shaft 118. The disk can, alternatively, be placed on the condenser side of the film. Theoretically, any integral number would serve. Suitable journaled support of the shaft 126 is suggested at 126'.

The disk 116 is synchronized to present diffused areas of the disk in proper areas of the film aperture to cover the "bad" frames and to follow them as they move. For this purpose the disk has thereon a plurality of light-diffusing means, including two peripherally outer means 132 and 134 and two inner means 136 and 138. As will be seen, the two means 132 and 134 are diametrically opposed and the two means 136 and 138 are opposed on a diameter 90° to that of the means 132 and 134. The disk 116 is transparent in an area 140 between the areas 132 and 134 and in the area 142 between the areas 134 and 132, it being observed that the areas 140 and 142 are also diametrically opposed. The areas 132 and 136 are circumferentially as well as radially offset at 144, and the same is true at 146 between 138 and 134, and again it will be seen that diametrical opposition occurs between 144 and 146.

The light-diffusing areas 132–136 and 134–138 are effected by any conventional means, such as by "frosting." These areas are timed with frame appearance in the film aperture so that they move in and "cover" the "bad" picture, thereby diffusing the light. Since diffusion undesirably cuts down the light intensity at the screen, the diffusion is made to be just sufficietn to "smear" the projected picture so that the "bad" picture profiles can no longer be distinguished in competition with "good" picture profiles projected between −22½° and +22½° of the square-with-axis condition. In this way a seeming anomaly is resolved: of projecting light without projecting the picture. The presence of light in the "bad-picture" area avoids the "busy-ness" and flicker that a dark area from an opaque shutter would have given.

Now, looking at the disk 116, it will be seen that there are two frosted or diffusing areas per frame. For example, starting with FIGS. 6, 7 and 8, it will be observed that when the frame I is in the aperture 64 the picture I' is projected, the prism 100 is positioned so that a pair of diametrically opposed facets are square with the projection axis. A full frame is being projected. The frosted area 132 is short of the film aperture (and, as shown in FIG. 7, above and to the right of the film aperture) and the frosted area 138, although past the film aperture, is offset below and to the left of it, so that a portion of the transparent segment 142, at 148, is in register with or overlies the film aperture and the registered frame I. Since a full frame or field is projected and since the prism is square with the projection axis, a good picture is projected, thereby not calling for any diffusion.

In FIGS. 9–11, the prism has turned one-half toward mid-transfer (approximately 11¼° as shown). The frame I is now becoming a departing or old frame and the next frame (frame II) is beginning to enter the film aperture 64 as an entering or new frame at the film aperture edge 70. The overlap of the frames I and II is such that the seam 114 is near the top of the screen as the pictures I' and II' overlap. The old frame I is still usable and, hence, is not affected by the frosted area 136, but the new frame II is still not actually usable as to the quality of its projected picture and, therefore, is covered by the frosted area 132, it being seen that these areas are so shaped and dimensioned as to follow the motion of the frames. Hence, diffused light through frame II is projected but the picture is not.

As the mechanism progresses to mid-transfer (FIGS. 12–14), the prism has rotated 22½° and the two frames I and II are projected to the screen at I' and II' to give the combination picture, the seam 114 appearing in the center. At this time, the frosted area 132 has left the film aperture 64 and the next frosted area 136 is ready to enter. The intervening transparent area 144 covers the film aperture 64 as the two frames I and II straddle the projection axis. No light diffusion occurs, since both pictures are usable.

But picture utility changes as the mechanism progresses beyond mid-transfer (FIGS. 15–17), wherein the old frame I begins to depart from the film aperture 64 and the new frame II occupies more of the aperture, projecting pictures at I' and II', with the seam 114 moving toward the bottom of the screen. Since the old frame I is deteriorating as to picture quality, the frosted area 136 moves across the film aperture in the area of its frame-departure edge 72 to "cover" the old frame; that is, it enables projection of light but not of picture.

The condition after FIGS. 15–17 will lead again to the square-with-axis condition of FIGS. 6–8, but frame II will take the place of frame I, at which time the offset transparent area 150 will coincide with the film aperture. At that time, the frosted area 134 will be ready to enter the "upper" area of the film aperture (the area adjacent to edge 70 of the aperture where "new" frames enter the aperture), to be followed by clear area 146, which is diametrically opposed to the clear offset area 144, followed by frosted area 138 and so on. The basic idea is to diffuse the light through the "bad" frames while projecting the picture of the "good" frames.

Up to this point, the areas 140, 142, 144, 146, 148 and 150 and diametrically opposed clear areas 152 and 154, extending inwardly from the frosted areas 132 and 134, respectively, have been regarded as clear or transparent. But, as a further refinement on the invention, certain of these areas may be treated, in any conventional manner, to serve as variable-density filters. For example, each of the offset areas at 144 and 146 should be perfectly clear, because they are effective at mid-transfer (FIG. 13); when light intensity at the screen is minimum, but their respective trailing portions 140 and 142 and their respective leading portions 152 and 154 would be of progressively increasing density, ending respectively at 150 and 148. That is, maximum density would occur at 148 and at 150 when the frame and prism are square with and centered on the projection axis (FIGS. 6–8) at which time the light intensity at the screen would otherwise be greatest. Minimum density (clear glass) would be provided at mid-transfer (FIGS. 12–14) in the areas 144 and 146, respectively, at which time the light intensity at the screen is least. As a result the densest filtering areas reduce the light intensity at the peaks of the intensity curve (a subtractive process), while the valleys of the intensity curve remain unaffected. There will be, of course, a reduction in the average brightness of the picture due to reducing the total light flux per frame that reaches the screen. The net result is a reduction in fluctuation of light intensity at the screen and a consequent reduction of flicker.

The dimensional and configuration characteristics of the frosted areas are such that no two of them cover or enter the film aperture at the same time. This is, of course, consistent with effecting light diffusion on the entering (new) and departing (old) frames. Starting with FIGS. 6–8, it is seen that a single frame I is centered in the film aperture 64, the prism is "square" with the projection axis, and the clear area 148 of the disk (i.e., clear, except for the variable-density filter) is over the film aperture. As the film moves (here downwardly), the frame I is departing but it is not an unusable old frame until it reaches, say, the position just prior to that of FIGS. 15–17. Hence, the frame I goes through the phase of FIGS. 9–11 unaffected by diffusion. But the entering new frame II is covered immediately upon entry into the film aperture 64, for, until it nearly reaches the phase of FIGS. 12–14, it is not yet a usable new picture but, when it attains that status, the frosted area 132 moves out of the film aperture, leaving the clear area 144 in or over the "new-picture" portion of the aperture. The frosted area 136 is about to enter as the frame I begins to become unusable. Although the frosted areas are shown on a disk and are on that basis curved so as to follow their respective frames, other media could be employed, such as linear carriers, cams, "shutter-like" devices (but diffusing and not blocking light). Hence, each frosted area 132, 134 may be regarded broadly as a first light diffusing means movable into the film aperture in progressively increasing covering relation to the frame-entry edge 70 thereof; and each frosted area 136, 138 is a second diffusing means movable into the film aperture in progressively decreasing covering relation to the lower or frame-departure edge 72 of the aperture. The disk is means carrying these light-diffusing means for sequential movement and in synchronism with the film travel so as to follow, respectively, the new and old frames. The clear area 144 spatially separates the frosted areas 132 and 136; the clear area 146 does likewise for the frosted areas 134 and 138. As already stated, the areas 144 and 146, as well as those at 140, 142, 148, 150, 152 and 154, could be transparent, or even omitted, especially if the designer does not care to use the variable-density-filter feature in the areas 140 and 142.

FIG. 20 shows graphically how the frosted areas cut off the intensity peaks to "level out" or to partially "level out" the intensity of the projected light.

Attention is directed now to another feature of the invention, to which general reference has been made above in connection with the discussion of picture "jump" as related to prism characteristics, especially in prisms having few facets with consequent inability of the prism to compensate fully for film motion. This condition, without correction, is illustrated graphically in FIGURE 18.

FIG. 18 plots image "jump" that occurs at the screen when no correction is made. The rotating prism is represented schematically as a flat plate between the film 60 and projection lens 66. The opposite facets of the prism that operate to refract the light are equivalent to a flat plate. It has been shown above that the rotating prism and film drive are geared to each other so that, in mathematical terms, their motions bear a linear relationship to each other.

When the prism is square with the axis of the system (FIGS. 3 and 5–7), a point G at the film and on the projection axis projects to a point H', centered on the axis at the screen. As the film moves (downward in FIG. 18) and the prism rotates (counterclockwise in FIG. 18) to a position such as that shown in FIG. 18, point G on the film has moved down and is projected through the prism and lens 66 and is refracted by the prism by an amount that is just about correct to bring the projected point back to the center of the screen. This correction is imperfect, however, and G actually projects to H at the screen, a little above screen center H'. Tracing backward through the system from screen center H', it will be found that the corresponding point on the film is actually point G', displaced from the desired point G. Point G' is the point that actually projects to the screen center. Distance HH' at the screen is "jump." To correct for this "jump" condition, the invention provides a glass (or equivalent) plate 156, hereinafter called a wobble plate, mounted to oscillate or wobble in timed relation to film travel and prism rotation. The results are illustrated graphically in FIG. 21 and schematically (and exaggerated) in FIG. 19. In FIG. 19, note that point G at the center of the frame is re-refracted at the wobble plate so as to be projected to screen 50 to coincide with point H' at the center of the screen. All other points on the film frame are likewise projected to the screen in their true relationships (except as affected by aberrations) because of the added refraction obtained at the wobble plate.

The wobble plate is suitably fixed to a shaft 158 (FIG. 5), appropriately journaled at 158'—158' so that its axis lies in the plane of the face of the plate 156 toward the prism 100 and also intersects and is perpendicular to the projection axis. Also, the shaft axis is optically parallel to the prism axis. In FIG. 5, there is optical parallelism but not structural parallelism because of the bend or fold created in the projection axis by the mirror 54. The plate is caused to wobble through one cycle per frame, here via driving means including a bevel gear 160 keyed to the prism shaft 102 and meshing with a bevel pinion 162 which in turn oscillates the plate 156 through a pitman arm 164 and arm 166 keyed to the plate shaft 158. The pinion 162 may be journaled in any convenient manner, suggested at 162' (FIG. 23).

As stated, FIG. 19 shows, in a somewhat exaggerated manner for purposes of elaboration, how the wobble plate corrects for the small residual motion of the film that is not compensated for by the prism. FIGS. 6 through 17 illustrate the cycle and synchronism of the plate's oscillation.

In FIGS. 6–8, where the frame I is centered in the film aperture 64 and the prism 100 is square with the projection axis, the plate 156 is also square with the projection axis, since the light rays are passing squarely through the prism (subject to qualification later as to correction for aberration). But, as the film moves, say, to the condition of FIGS. 9–11, the prism turns (here approximately 11¼°), which is the condition shown exaggerated in FIGS. 18 and 19. FIG. 18 has already been described as respects the the undesirable results that occur without compensatory correction. FIGS. 9–11 correspond, in showing the position of the wobble plate 156, with FIG. 19; i.e., the wobble plate moves angularly a small increment and in a clockwise direction from its square condition.

As the system attains mid-transfer (FIGS. 12–14), the prism 100 has diametrically opposed corners centered on the projection axis, and the wobble plate 156 returns (counterclockwise) to its square condition.

Now, as the prism moves out of mid-transfer to the condition of FIGS. 15–17, it turns say, another 11¼°, and this time the wobble plate moves synchronously but in a counterclockwise direction; i.e., the reverse of FIGS. 9–11. As the prism again moves into square with the projection axis, repeating the condition of FIGS. 6–8, the wobble plate returns (clockwise) to square condition, and so on.

The wobble or motion of the wobble plate 156 is sinusoidal, but specially shaped cams are not needed, since the motion can be simulated closely enough by simple linkage as shown. By correct design, the prism is made to have such a combination of thickness and index of refraction that there will be no image jump, even without a wobble plate, at two parts of the cycle: (a) when paired facets are square with the projection axis, FIGS. 6–8, or (b) at mid-transfer (FIGS. 12–14). Since, in the latter case, two partial frames are being projected at once, the wobble plate must be square with the projection axis so as not to act differently on the two pictures being projected and because, with a correctly designed prism, there is no image jump at this time anyway.

Any location of the wobble plate 156 between the projection lens 66 and screen 50 would be satisfactory but to achieve a still further feature of the invention it is located approximately at the front focal point of the projection lens, which enables it to serve a second purpose.

It was previously stated that light rays passing through the prism 100 were affected by different degrees of aberration. This characteristic is illustrated in FIG. 5, wherein the line 168 shown on the film side of the prism and parallel to the prism axis, represents least aberration and the line 170 represents most aberration. Because rays passing through the prism 100 are bent by the mirror 54, they will be represented by lines 168' and 170' beyond the projection lens 90, the plane of which is at 90° to the plane of lines 168 and 170. The line pairs are, nevertheless, optically the same; i.e., lines 168 and 168' are both "parallel" to the prism axis and to the axis of the wobble plate shaft 158 and lines 170 and 170' are both transverse to the prism axis. Hence, the unequal aberrations as represented by the lines 168' and 170' are to be minimized by a non-circular optical stop, (having unequal "diameters" or axes in these two directions) provided in this case by an oval opening 172 in an opaque cover 174 on one side of the wobble plate 156. The long dimension of the opening or stop 172 parallels the line 168' (optically parallel to the line 168) since this is the direction of least aberration and more light can be allowed to enter. The short dimension lies parallel to the "most" aberration line 170'. This optical stop transmits only those light rays that are not too far from collimated as they pass through the prism 100. As the plate 156 wobbles, the long dimension of the stop 172 remains substantially the same, whereas the short dimension foreshortens as seen by the projection lens. As already indicated, the stop 172 and wobble plate 156 could be provided as separate elements, leaving the stop at the front focal point of the projection lens and selecting a different location for the wobble plate, but combining the two effects economies in design as well as function.

The use of the wobble plate as distinguished from a wobbling mirror, for example, results in movement of the light rays in translation (FIG. 19) so that the offset of the light at the screen is the same as it is at the wobble plate and is not amplified as it would be from a mirror. The wobble plate, furthermore, is relatively insensitive to small errors in the motion, because relatively large cam throws can be used that, in turn, produce accurate and stable results that do not change appreciably with wear.

If the stop 172 were very small (almost a geometrical point) and if it were at the front focal point of the projection lens 66, the only light that would pass through it would be that beam of light whose rays were parallel to each other (and to the projection axis) as the light passed between the film and the prism. In this way the opening at the wobble plate would monitor the light so that only light that is collimated in the prism will pass through this opening. In fact, the small opening monitors even more severely than that, accepting only one of many possible beams of collimated light: that one which is parallel to the projection axis as it approaches (and leaves) the prism. Collimated beams at an angle to the projection axis would be discarded. The purpose of monitoring the light is to assure that only that light that is fairly well collimated at the prism is used in image formation. It is well known in the art that light, passing through a prism that is equivalent to a flat plate, must be collimated to avoid chromatic aberration. In addition, in practice, if the light is not so monitored, a series of slightly separated images is found to appear on the screen. A further reason for monitoring the light after it has passed the condenser-film-prism-lens system is because of the difficulty in collimating the light at the condenser before it reaches the prism. Such collimation might be provided by a high quality condenser combined with a small-area arc course.

An alternative to the elliptical stop 172 would be to collimate the light in a condenser before the light enters the prism. This kind of system is called a telecentric system. The collimated light through the prism would then subsequently be focused by the projection lens into a relatively small spot of light at the front focal point of the lens, thereby making a sort of "eye" without necessitating the use of a mask with an elliptical hole at that point.

The internal-reflector lamp 34 that is used here, however, produces such a conglomeration of ill-focused light that it is not possible to operate on this light optically to collimate it. For this reason no condenser is used outside the lamp. The system, as a consequence, is *not* telecentric. But the some general result is achieved by accepting the conglomeration of light through the prism and monitoring it at the front focal point of the lens. It is at this point that the stop 172 serves as a monitoring hole to block the "bad" light and let the "good" light through. That is, the stop 172 works in a subtractive fashion.

Where a beam of more-or-less collimated light passes through the prism, the individual rays in that beam do not converge to form the same point on the screen. The reason for this is that the stop is not optically conjugate (in focus) with either the film or the screen. The net result is that a beam of light may be a beam relative to the stop but will not be a beam relative to either the film or the screen.

But the stop 172 is not indefinitely small. It has physical size and, as a consequence, monitors the light into collimated beams only imperfectly. Because of the physical size of the stop, it also allows beams to pass that are somewhat angled to the projection axis as they approach the prism, as well as passing that beam which is parallel to the projection axis.

The optical stop 172 severely limits the light that reaches the screen. This is the price paid for using a rotating prism: only a small proportion of the light is useable. It is, nevertheless, the purpose of the present system to pass more light than hitherto thought possible, while maintaining good image quality and freedom from excessive flicker and "jump".

It is desirable that the pivot axis of the wobble plate lie in the same plane as the stop, so that the stop will not move laterally while the plate wobbles.

Another advantage of the stop 172 is that it dictates the angles that the collimated beams (that pass through the stop) may make with the projection axis as they approach (and leave) the prism. Being elliptical, the stop calls for lesser beam angles in and around planes perpendicular to the prism axis, where greater aberrations are encoutered. In this way the stop makes a sharper distinction between "good" light and "bad" light than a telecentric system can. Having made this sharper distinction the stop reduces the aberrations in the light reaching the screen and this, in turn, allows the projection lens to be opened up wider to pass more light.

The speed of the lens may be about f/3.5, for example. In contrast, the speed of the lens in a system using a telecentric condenser would have to be limited to about f/6, due to the inability of such a system to distinguish the difference in aberration between the two directions (168' and 170').

The stop system has a still further advantage in that it permits the use of the internal-reflector lamp 34, which puts a great deal of light flux down the general direction of the optical axis, but which, being unfocusable in a telecentric condenser, is not useable in a telecentric system. The telecentric system, then, is forced either to use a relatively cheap, small-filament incandescent lamp (with consequent much less useable light flux) or an expensive arc lamp having a small source area.

Returning to the primary function of the wobble plate, which is to correct for "jump," it is desirable that the plate be located at the front focal point of the projection lens, not only to satisfy the secondary function described above, but also to minimize the size and weight of the plate, so that it will have minimum second mass moment to resist the rapid wobbling section that must be imparted to it.

A given ray of light, as it enters and leaves the wobble plate, is parallel to itself. The wobble plate, consequently, shifts the way in translation, so that the distance the ray is moved at the plate is equal to the distance the ray is moved at the screen. This distance is relatively small for a relatively large motion in wobble of the plate. In other words, the control of the correction at the screen is insensitive to small mechanical errors.

FIGS. 18 and 19 show only the direction ray. This is the ray that passes through the nodal point(s) of the lens and determines the position of the projected point on the screen. It is to be understood that there is an entire cone of light accompanying each direction ray. This cone is a beam of light related to the film or the screen, but is not a beam related to the stop 172 as noted before. It is the collimated beam relative to the stop that eliminates chroma.

The novel elliptical stop also takes into account the astigmatism in the optical system caused by the prism, which a telecentric system is unable to do. The aberrations caused by the prism in its various positions of rotation are more severe in rays in and around planes perpendicular to the prism axis than in rays in and around planes parallel to the prism axis—as noted before. The stop, consequently, can be a faster (i.e. wider) stop in direction 168' (FIG. 5) than it can in direction 170'—hence the elliptical shape. If the stop had been circular, its diameter would have had to be limited to the lesser of these two dimensions. As a result more total light is allowed to pass the stop, but without worsening the resolution of the projected picture.

It was previously noted that the facets of the prism act to restrict the light. FIG. 20 illustrates this characteristic graphically. A pair of opposite facets presents its broadest aspect to passage of light when these facets are square with the optical axis. As the prisim rotates these facets turn and "choke off" the light. In turning they present a narrower pair of "slits" (as it were) for the light to get through. The light that covers the first facet, furthermore, will not cover the second facet when the prism is turned, thereby causing the combination effect of the two facets to be a rapid "choking off" of the light.

As a result, the prism acts like a "valve" that alternately reduces the light intensity when the prism turns toward mid-transfer and then increases the intensity when the prism turns toward the square-with-axis condition. This intensity varies from bright to dim in half a cycle (frame) and back to bright in the next half cycle.

In this way there is a sinusoidal variation (176, in FIG. 20) in light intensity at the screen, producing a sensation of flicker. In rotating prism-systems with large numbers of facets (24 preferred) the facet-to-facet angle of turn is so small that the sinusoidal variation is also small. In addition, with 24 facets in the middle of transfer (i.e. with prism corners on the projection axis) both old and new pictures are projected at the same time, each covering the full field at the screen, so that their brightnesses are additive at the screen. This action tends to fill in the "valley" in the sine curve so that there is still less variation of light intensity at the screen.

With an eight-sided prism, the light-intensity variation is intrinsically great (FIG. 20). In the middle of transfer only fractional pictures are projected, that barely join each other at the seam 114. Since each projected picture does not cover the field, the brightnesses of the two pictures are not additive (except where they overlap at the seam). Thus, there is no filling in of the relatively deep "valley" in the sine curve.

The only way to "level-off" the sine curve is by subtractive means, i.e. by cutting off the peaks of the intensity curves as shown at 178 in FIG. 20. This is done with the variable density filter on the rotating disk 116 as noted before.

FIG. 21 graphically shows "jump" as the ordinate and prism rotation as the abscissa or X axis. Positions in which the prism is square with the optical axis are denoted at Y. The abscissa between 0 and 22½° represents an old frame departing; between 22½° and 45° a second frame entering; between 45° and 67½° such second frame departing and so on. The characteristic curve 180 shows an upward "jump" (on the screen) during the first part of the rotation away from the condition in which the prism is square with the optical axis. Then this curve descends and crosses the X axis at 22½°. At the point (Y) where the curve again intersects the X axis, the "jump" is downward.

The portion of the curve above the axis corresponds to the old frame (full line). The curve 184 for the new frame is inverted (shown in dotted lines) and comes in from above the X axis, crosses the X axis at 22½°, and returns upward to cross the X axis again at 45°; at this last intersection with the X axis (at Y) the prism is again square with the projection axis. As the curve 184 is continued it still applies to the same frame of film, but now the frame is outgoing (or "old") instead of incoming (or "new"). The total curve belonging to a given frame is shown in one type of line and is like a letter S laid on its side. The middle of the S is where the prism is square with the projection axis. A third S is shown in dot-dash-lines at 186.

The other two points where the S curve crosses the X axis (toward the ends of the S) can be designed to be at various distances from the center of the S by selecting the desired combination of prism thickness and index of refraction. Those shown in FIG. 21 are 22½° from the center. The reason for selecting 22½° is so that the S for each frame will join the S for the next frame—and so on. Thus, all the S's taken together join to form a sinusoidal curve. The wobble plate 156 can now be brought back to square with the projection axis at a point such as 22½° and correct for the jump in two consecutive frames simultaneously. This would not have been possible if the curves for these two frames had not crossed the X axis at the same point.

In and around 22½° two adjacent curves such as 180–184, 184–186 etc. are nearly tangent to each other. This is the area where two fractional pictures are being projected on the screen simultaneously (i.e., the time that the seam 114 moves across the screen). After the seam has moved across the screen the old frame is lost. This is the "tail" 182 of the S curve 180. By the same token the new, incoming frame, before it has reached 22½° is operating on the incoming tail 188 of its S curve and is not being projected. As the new picture approaches 22½° the seam moves onto the screen and the new picture starts to be fractionally projected. Essentially, then, the jump follows the sinusoidal curve shown in FIG. 21. This curve represents an easily mechanized motion for the wobble plate. This motion can be simulated by the Pitman motion shown in FIG. 5 or by a Scotch yoke, cam, etc.

The wobble plate moves from square at 0° to maximum wobble clockwise at (roughly) 11¼° (on FIG. 21), back (counterclockwise) to square at 22½°. Continuing counterclockwise, the wobble plate moves beyond square to maximum wobble in a counterclockwise direction at (roughly) 33¾°, and back clockwise to square again at 45°. Thus, the wobble plate completes a left-right wobble cycle in 45° of prism rotation (=one frame). Note, too, for purposes of vizulation, one cycle can best be defined by starting from one extreme of the wobble, rather than starting in the middle as we did above. Then a cycle(45°) carries the plate to its other extreme and back again. Obviously, if one direction of wobble plate displacement from square corrects for upward jump, the opposite displacement from square corrects for downward jump.

Picture jump has been discussed as related to the center of the projected picture. Actually all parts of the field jump a little differently, because of distortion due primarily to variable conditions of refraction within the prism. These variations in jump have been disregarded in the foregoing description.

Features and advantages other than those outlined above will occur to those versed in the art, as will modifications of the structure disclosed, all without departure from the spirit and scope of the invention.

What is claimed is:

1. In motion-picture apparatus of the type in which film travels continuously and at a uniform rate through a film plane and past a film aperture centered on an optical axis and disposed between a light source and a regular prism rotating continuously at a rate of one prism facet per frame of film, the improvement residing in mechanism for regulating light intensity at the aperture as consecutive frames enter, are exposed at and depart from the aperture comprising: first light-diffusing means movable in progressively increasing covering relation to that portion of the aperture between its frame-entry edge and substanially its center and said means being movable thence clear of the aperture, second light-diffusing means movable in progressively decreasing covering relation to that portion of the aperture between substantially its center and its frame-departure edge and movable thence clear of the aperture, and means carrying said first and second means for sequential movement and in synchronism with film travel to follow respectively entering and departing frames, said first and second means being so spatially related that both are clear of the aperture and thus uncover the aperture for the transmission of light at higher intensity than the diffused light under conditions where a frame is centered in the aperture and where any two consecutive frames are half-centered in the aperture respectively at opposite sides of the optical axis.

2. The invention defined in claim 1, including: a projection lens centered on the optical axis and spaced therealong from the prism for projecting light along said axis; a transparent optical plate element transverse to and intersected by said axis beyond the lens and mounted on an axis intersecting the optical axis and optically parallel to the axis of rotation of the prism for oscillation in successive cycles of two positions per cycle in which said element is respectively perpenducular and tilted to the optical axis; and means connected to said element and operative in timed relation to film travel and prism rotation for oscillating said element at a rate of two cycles per frame of film travel past the film aperure and indexed with film travel so that said perpendicular positions occur whenever any frame is centered in the aperture and when two consecutive frames are each half-centered in said aperture.

3. The invention defined in claim 2, including: means at the front focal point of the lens providing a relatively small oval-like optical stop having its long dimension optically parallel to the prism axis and operative to eliminate light rays that depart excessively from a collimated condition during passage through the prism.

4. The invention defined in claim 3, in which: the axis of oscillation of the element occurs at said front focal point of the lens and said stop is provided on said element as a transparent area thereof, the remainder of said element bordering said area being opaque.

5. In motion-picture apparatus of the type in which film travels continuously and at a uniform rate through a film plane and past a film aperture centered on an optical axis and disposed between a light source and a regular prism rotating continuously at a rate of one prism facet per frame of film, the improvement residing in mechanism for regulating light intensity at the aperture as consecutive frames enter, are exposed at and depart from the aperture comprising: a member movable in a path generally parallel to the film plane and transverse to the direction of film travel; first light-diffusing means on the member and movable in progressively increasing covering relation to that portion of the aperture between its frame-entry edge and substantially its center and said means being movable thence clear of the aperture, second light-diffusing means on the member and spaced along said path from said first means and movable in progressively decreasing covering relation to that portion of the aperture between substantially its center and its frame-departure edge and movable thence clear of the aperture, said member in portions thereof other than said first and second means being constructed to pass light at higher intensity than said diffused light, means for moving said member in synchronism with film travel to cause said first and second means to follow respectively entering and departing frames, said first and second means and said other portions of the member being so spatially related that both of said means are clear of the aperture and certain of said other portions are in register with the aperture under conditions where a frame is centered in the aperture and where any two consecutive frames are half-centered in the aperture respectively at opposite sides of the optical axis.

6. The invention defined in claim 5, in which: certain of said member portions include light-filter means operative in the aperture under each condition in which a frame is centered in said aperture.

7. The invention defined in claim 6, in which: said certain member portion is of varying density along the path of movement of the member, being of greater density in the area thereof that is in the aperture under each condition in which a frame is centered in said aperture and of lesser density in the area thereof that is in the aperture under each condition in which two consecutive frames are half-centered in the aperture respectively at opposite sides of the optical axis.

8. In motion-picture apparatus of the type in which film travels continuously and at a uniform rate through a film plane and past a film aperture centered on an optical axis and disposed between a light source and a regular prism rotating continuously at a rate of one prism facet per frame of film, the improvement residing in mechanism for regulating light intensity at the aperture as consecutive frames enter, are exposed at and depart from the aperture comprising: a disc rotatable on an axis normal to the film plane and having it peripheral portion movable in overlapping relation to the film aperture, first light-diffusing means on said peripheral portion and movable in progressively increasing covering relation to that portion of the aperture between its frame-entry edge and substantially its center and said means being movable thence clear of the aperture, second light-diffusing means on said peripheral portion and spaced circumferentially and offset radially of the disc from said first means and movable in progressively decreasing covering relation to that portion of the aperture between substantially its center and its frame-departure edge and movable thence clear of the aperture, said disc in parts of said peripheral portion unoccupied by said first and second means being constructed to pass light at higher intensity than said diffused light, means for rotating the disc in synchronism with film travel to cause said first and second means to follow respectively entering and departing frames, said first and second means and said other disc parts being so spatially related that both of said means are clear of the aperture and certain of said other disc parts are in register with the aperture under conditions where a frame is centered in the aperture and where any two consecutive frames are half-centered in the aperture respectively at opposite sides of the optical axis.

9. The invention defined in claim 8, in which: said disc is predominantly a transparent optical element except in the areas occupied by said first and second means.

References Cited in the file of this patent
UNITED STATES PATENTS

| | | |
|---|---|---|
| 2,070,282 | Leventhal | Feb. 9, 1937 |
| 2,331,941 | Terwilliger | Oct. 19, 1943 |
| 2,441,013 | Ehrenhaft | May 4, 1948 |
| 2,464,138 | Luboshez | Mar. 8, 1949 |
| 2,482,197 | McGinty | Sept. 20, 1949 |
| 2,819,649 | McLeod et al. | Jan. 14, 1958 |
| 2,896,504 | Schwesinger | July 28, 1959 |
| 2,938,425 | Lopez-Henriquez | May 31, 1960 |
| 3,038,372 | Lessman | June 12, 1962 |